F. C. PRINDLE.
Movable Hopper for Tanks, &c.

No. 204,370. Patented May 28, 1878.

Witnesses
Henry Howson Jr.
Harry Smith

Inventor
Franklin C. Prindle
by his Attorneys
Howson and son

UNITED STATES PATENT OFFICE.

FRANKLIN C. PRINDLE, OF PHILADELPHIA, PENNSYLVANIA.

IMPROVEMENT IN MOVABLE HOPPERS FOR TANKS, &c.

Specification forming part of Letters Patent No. 204,370, dated May 28, 1878; application filed October 24, 1877.

*To all whom it may concern:*

Be it known that I, FRANKLIN C. PRINDLE, of Philadelphia, Pennsylvania, have invented a new and useful Improvement in Movable Hoppers for Tanks, &c., of which the following is a specification:

The object of my invention is to so combine a movable hopper or funnel with a tank having two or more openings situated at a distance from each other that it will facilitate the depositing of the "spoil" raised by dredging-machines at different points in the said tank.

Figure 1:
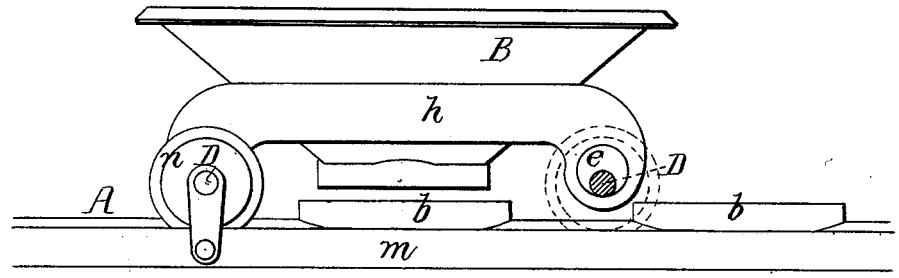
Figure 2:
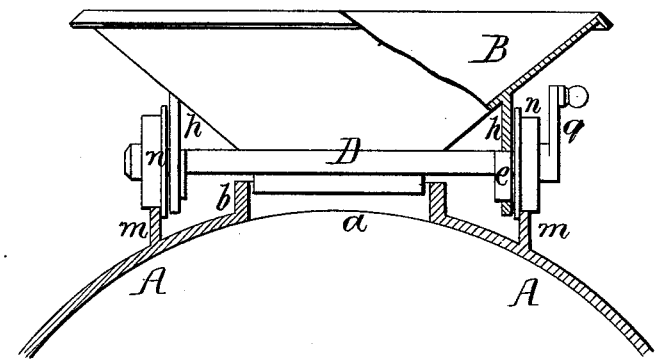
Figure 3:
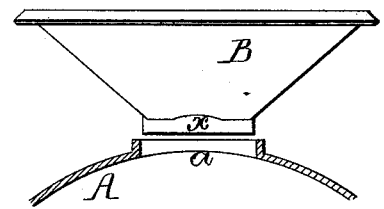
Figure 4:
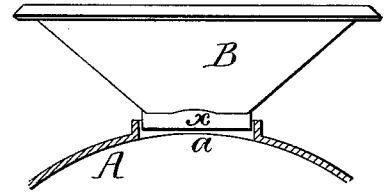
Figure 5:
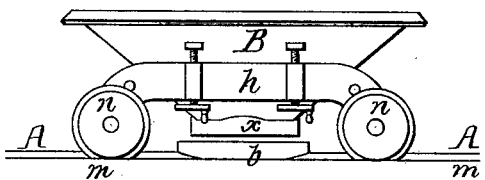

In the accompanying drawings, Figure 1 is a side view of the movable hopper applied to a tank; Fig. 2, an end view, partly in section; Figs. 3 and 4, diagrams showing the hopper elevated and depressed; and Fig. 5 represents a modified plan of raising and lowering the hopper.

A represents a cylindrical tank, such as I propose to place on a barge or scow for receiving the spoil excavated by dredging-machines, this tank having in the top several openings, $a$, arranged at suitable distances apart, and each opening having at its edge an annular rib, $b$.

Two longitudinal rails, $m\ m$, are secured to the top of the tank, and extend from end to end of the same, or nearly so, and to these rails are adapted the flanged wheels $n$, hung loosely on the two shafts D D, which have their bearings in bars $h\ h$ secured to and projecting at each end from the hopper, so that the latter can be moved on the rails $m\ m$ to a position above any one of the openings $a$ through which it is desired to direct the spoil from the dredging-bucket into the tank, the hopper serving as the directing medium, and being large enough at the top to prevent the escape of the spoil over the edges. After the hopper has been used in connection with one opening it can be moved to another, and a cover may then be fitted to the first opening.

When the movable hopper is so constructed that it cannot be raised or lowered, its discharging end $x$ must always be slightly above the upper edge of the annular rib at the edge of each opening in the tank. I prefer, however, that the hopper should be provided with such appliances that it can be readily raised or lowered—raised as shown in Figs. 1 and 5 when the hopper has to be moved along the rails, and lowered so that its discharge end will enter an opening, $a$, in the tank, as shown in Fig. 4, when the hopper has to be used as a funnel for directing the spoil from the dredging-bucket into the tank.

I prefer the following device for raising and lowering the hopper: To each of the two shafts D are secured two eccentrics, $e$, which are adapted to openings in the bars $h\ h$ of the hopper. By turning the shafts D in one direction the hopper will be raised to the position, Fig. 1, after which the hopper can be moved to and fro on the rails, and by turning the shafts in the opposite direction the hopper will be lowered so that its discharging end will enter an opening, $a$, of the tank.

In the modification, Fig. 5, the two bars $h\ h$ are separate from the hopper, and constitute a frame, each bar carrying two screws, the upper ends of which bear against lugs on the hopper, so that by turning the screws the said hopper may be raised or lowered. Other plans of raising and lowering the hopper will readily suggest themselves.

The rails $m\ m$ may be secured to the deck of the barge or scow containing the tank; but I prefer to secure them to the tank itself, as shown and described.

I claim as my invention—

1. A tank, A, having two or more openings situated at a distance from each other, in combination with a hopper, B, having wheels adapted to rails on or near the said tank, all substantially as set forth.

2. The combination of a tank or other receptacle, A, having rails $m\ m$, with a hopper, B, and devices whereby the latter may be raised or lowered, all substantially as set forth.

In testimony whereof I have signed my name to this specification in the presence of two subscribing witnesses.

FRANKLIN C. PRINDLE.

Witnesses:
RICHARD L. GARDINER,
HARRY SMITH.